(12) United States Patent
Lee et al.

(10) Patent No.: US 7,297,451 B2
(45) Date of Patent: Nov. 20, 2007

(54) BLACK MATRIX, METHOD FOR THE PREPARATION THEREOF, FLAT DISPLAY DEVICE AND ELECTROMAGNETIC INTERFERENCE FILTER EMPLOYING THE SAME

(75) Inventors: Ho Chul Lee, Gyeonggi-do (KR); Euk Che Hwang, Gyeonggi-do (KR); Jin Young Kim, Gyeonggi-do (KR); Chang Ho Noh, Gyeonggi-do (KR); Ki Yong Song, Seoul (KR); Sung Hen Cho, Seoul (KR)

(73) Assignee: Samsung Corning Co., Ltd., Suwon-si, Gyeonggi-do (KR)

( * ) Notice: Subject to any disclaimer, the term of this patent is extended or adjusted under 35 U.S.C. 154(b) by 54 days.

(21) Appl. No.: 11/185,695

(22) Filed: Jul. 21, 2005

(65) Prior Publication Data

US 2006/0019182 A1    Jan. 26, 2006

(30) Foreign Application Priority Data

Jul. 21, 2004    (KR) ............................... 2004-56828

(51) Int. Cl.
G02B 5/20    (2006.01)
(52) U.S. Cl. .................... 430/7; 430/321; 174/388; 174/392; 205/122; 205/187; 427/162; 427/164; 427/305
(58) Field of Classification Search .................. None
See application file for complete search history.

(56) References Cited

U.S. PATENT DOCUMENTS

| | | |
|---|---|---|
| 4,822,718 A | 4/1989 | Latham et al. |
| 5,176,971 A | 1/1993 | Shimamura et al. |
| 5,235,139 A | 8/1993 | Bengston et al. |
| 5,378,274 A | 1/1995 | Yokoyama et al. |
| 5,587,818 A | 12/1996 | Lee |
| 5,592,317 A | 1/1997 | Fujikawa et al. |
| 5,626,796 A | 5/1997 | Tsujimura et al. |
| 5,639,579 A | 6/1997 | Hayashi et al. |
| 5,714,286 A | 2/1998 | Uchikawa et al. |

(Continued)

FOREIGN PATENT DOCUMENTS

JP    2-153304 A    *   6/1990

(Continued)

*Primary Examiner*—John A. McPherson
(74) *Attorney, Agent, or Firm*—Buchanan Ingersoll & Rooney PC

(57) ABSTRACT

A novel black matrix, a method for preparing the same, and a flat display device and an electromagnetic interference filter to which the black matrix is applied. The black matrix is prepared by exposing a photoactive compound to form a latent pattern of nuclei for crystal growth and treating the latent pattern of nuclei for crystal growth with a metal salt solution to give a metal particle-deposited pattern; forming an electroless Ni-plated layer on the metal particle-deposited pattern; and forming an electroless Cu-plated layer on the electroless Ni-plated layer. Exhibiting improved black tone, which is achieved only by a selective multilayer plating process, without using expensive vacuum sputtering apparatus or a photolithographic process, the black matrix can be applied to various flat display devices. In addition, due to improved electric conductivity, the black matrix can be used in an electromagnetic interference filter, without employing an additional front surface blackening process.

24 Claims, 3 Drawing Sheets

U.S. PATENT DOCUMENTS

| | | |
|---|---|---|
| 5,866,298 A | 2/1999 | Iwamoto et al. |
| 5,908,497 A | 6/1999 | Morfesis et al. |
| 6,255,025 B1 * | 7/2001 | Akutsu et al. ............... 430/7 |
| 6,294,313 B1 | 9/2001 | Kobayashi et al. |
| 6,344,309 B2 | 2/2002 | Fukushima et al. |
| 2004/0265730 A1 | 12/2004 | Takahashi et al. |
| 2005/0202599 A1 * | 9/2005 | Noh et al. ............... 438/128 |
| 2006/0097622 A1 * | 5/2006 | Noh et al. ............... 313/495 |
| 2006/0105251 A1 | 5/2006 | Hwang et al. |

FOREIGN PATENT DOCUMENTS

| | | |
|---|---|---|
| JP | 8-34923 | 2/1996 |
| JP | 11-143056 | 5/1999 |
| JP | 11-326606 | 11/1999 |
| JP | 11-352310 | 12/1999 |
| JP | 2000-147240 | 5/2000 |

* cited by examiner

BLACK MATRIX, METHOD FOR THE PREPARATION THEREOF, FLAT DISPLAY DEVICE AND ELECTROMAGNETIC INTERFERENCE FILTER EMPLOYING THE SAME

BACKGROUND OF THE INVENTION

This non-provisional application claims priority under 35 U.S.C. §119(a) on Korean Patent Application No. 2004-56828 filed on Jul. 21, 2004, which is herein expressly incorporated by reference.

1. Field of the Invention

The embodiments of the present invention relate to a novel black matrix, a method for preparing the same, a flat display device comprising the same, and an electromagnetic interference filter comprising the same. More particularly, the embodiments of the present invention relate to a black matrix comprised of a substrate, a photosensitive film, a Ni-plated layer and a Cu-plated layer, which is improved in blackening tone and electric conductivity, a method for preparing the same, and the applications of the black matrix, including a flat display device and an electromagnetic interference filter.

2. Description of Prior Art

A black matrix, which is the generic description of a light shielding film that separates the pixels of a screen's color filter, is applied to all display devices to prevent color mixing among R (red), G (green) and B (blue) and to improve the contrast therebetween. In liquid crystal displays, a black matrix is incorporated within a color filter by being positioned between any two of R, G and B picture elements in light emitting devices, such as fluorescent displays and OLEDs. In the case of plasma displays, a black matrix is prepared by additionally blackening copper wires of an electromagnetic interference filter, so that visibility can be prevented.

Thus far, most black matrixes have been prepared by patterning a film of metal such as chromium in a photolithography process, as representatively disclosed in U.S. Pat. Nos. 5,378,274 (Yokoyama et al.), 5,587,818 (S. Lee et al.) and 5,592,317 (Fujikawa et al.). Chromium is vacuum deposited on the internal surface of a display screen to form a light absorption coating, which is then patterned using photolithography, so as to prepare a black matrix. However, this conventional method has the disadvantage of having a high production cost. Further, the black matrix prepared by this conventional method exhibits high reflectance and a color filter incorporating this black matrix therewith is poor in visibility due to its high light reflectance.

To solve this problem, a method is suggested in which a metal chromium film is positioned between oxide layers, such as chromium oxide layers, so as to achieve low reflectance properties. The black matrix prepared according to this method has advantages of exhibiting high visible light absorption, being thin and having a high optical density. However, this method is environmentally unfavorable not only because chromium is converted to harmful chromium (VI), but also because heavy metal, including an oxidizing agent, such as ammonium-cerium (IV), is required.

Therefore, there has been a strong need for an organic black matrix paint that is inexpensive compared to chromic materials, does not produce pollution in the environment, and can be easily patterned, in the industry.

In the past decade, extensive research into organic black matrix materials has been conducted. In U.S. Pat. Nos. 4,822,718 (Latham et al.) and 5,176,971 (Shimamura et al.) dyed black matrix compositions comprising polyimide precursor binders are disclosed. These compositions, however, suffer from the drawbacks of short storage stability, low optical density after deposition, poor thermal stability, and low fade resistance. In addition, "dye-based" compositions produce dyed leachates while subsequent processes are conducted. In principle, dyes cannot make photo images, so no patterns may be formed without an additional photoresist layer.

In order to achieve higher optical densities, better thermal stability, and greater resistance to chemicals and fading, various pigment-dispersed (discriminated from "dye-based") black matrix coating systems have been developed. However, none of the pigment-dispersed coating compositions developed thus far is found to satisfy a black matrix system in terms of high electric resistance, small film thickness, and high optical density.

Japanese Pat. Laid-Open Publication No. 8-34923 (Sekisui Chemical Industries, Ltd.) discloses a two-step process for preparing a black matrix, in which a composition comprising a photosensitive polymer and a black dye is applied onto a substrate and a black-dyed coating thus formed is exposed through a mask to form a desired pattern which is then colored with black dye. This method is too troublesome to be commercially applied.

When a matrix is prepared from an organic material, there occur problems in that light sensitivity is deteriorated upon frequent light exposure and the storage stability needs to be extended. Compositions having improved storage stability are disclosed in U.S. Pat. Nos. 5,626,796 (Tsujimura et al.), 5,639,579 (Hayashi et al.), 5,714,286 (Uchikawa et al.) and 5,866,298, and Japanese Pat. Laid-Open Publication Nos. 2000-147240, 11-143056, and 11-326606. However, none of the compositions having improved storage stability disclosed in the above literature can exhibit the high optical density of chromium black matrices. The reason is that since a resinous black matrix has poor absorbance compared to a metal black matrix, it must be made thick so as to obtain a necessary optical density. When a thick film is employed, a step problem is caused in subsequent processes, deteriorating the overall driving properties of the display device.

Japanese Pat. Laid-Open Publication No. 11-352310 discloses a method for preparing a black matrix using Ni and NiOx. Friendly as it is to the environment, this method needs a vacuum apparatus for forming Ni films, unlike a conventional sputtering apparatus, and in addition, it is difficult to maintain constant etching conditions.

OBJECTS AND SUMMARY

Leading to the embodiments of the present invention, intensive and thorough research, conducted by the present inventors, into black matrixes for use in flat display devices, resulted in the finding that a low reflection black matrix can be readily prepared by forming a photosensitive film consisting of photoactive compounds at a predetermined thickness, exposing the film to light to form a latent pattern of nuclei for crystal growth, and plating the latent pattern with a desired metal to grow metal crystals.

Therefore, it is an object of the embodiments of the present invention to provide a black matrix which has good adhesion to a substrate and excellent light absorption and which is readily patterned at high resolution.

It is another object of the embodiments of the present invention to provide a method for preparing a black matrix, which can be achieved at low cost, without employing an expensive vacuum deposition apparatus or a photoresist-aided metal removal process.

It is a further object of the embodiments of the present invention to provide a flat display device comprising the black matrix, which has greatly improved brightness and contrast ratio and an electromagnetic interference filter having an excellent electromagnetic shielding effect.

In an aspect of the present invention, there is provided a black matrix, comprising: (i) a substrate; (ii) a photosensitive film; (iii) a Ni-plated layer; and (iv) a Cu-plated layer.

In another aspect of the present invention, there is provided a method for preparing a black matrix, comprising: (i) exposing a photoactive compound to form a latent pattern of nuclei for crystal growth and treating the latent pattern of nuclei for crystal growth with a metal salt solution to give a metal particle-deposited pattern; (ii) forming an electroless Ni-plated layer on the metal particle-deposited pattern; and (iii) forming an electroless Cu-plated layer on the electroless Ni-plated layer.

In further aspects of the present invention, there are provided an electromagnetic interference filter, comprising a black matrix of an embodiment of the present invention, and a flat display device, comprising a black matrix of an embodiment of the present invention.

BRIEF DESCRIPTION OF THE DRAWINGS

The above and other objects, features and advantages of the embodiments of the present invention will be more clearly understood from the following detailed description taken in conjunction with the accompanying drawings, in which.

DETAILED DESCRIPTION OF THE PREFERRED EMBODIMENTS

Figure 1A:
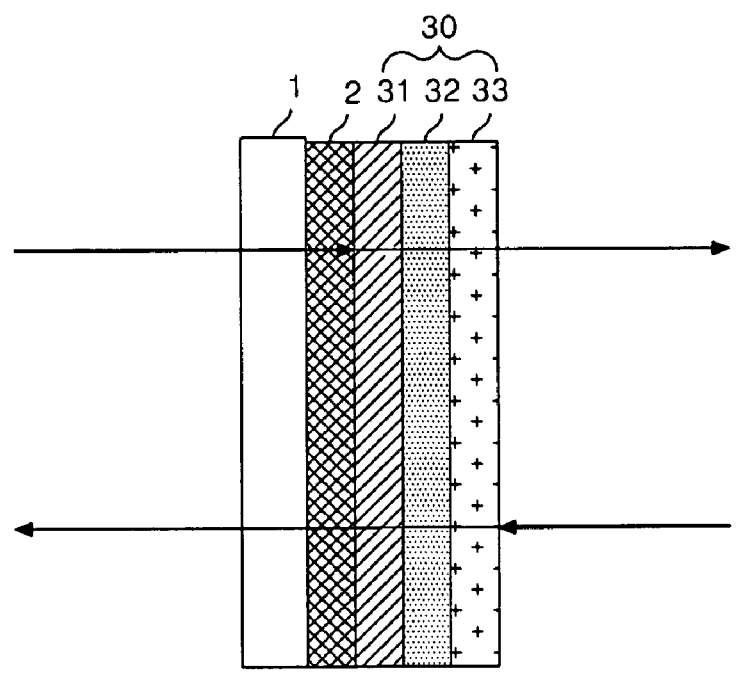
FIG. 1a is a schematic view showing a black matrix in accordance with an embodiment, in which light, whether incident from the front or rear side, cannot penetrate the black matrix due to the high dissipation coefficient k of the multilayered plated layer.

Reference should now be made to the drawings, in which the same reference numerals are used throughout the different drawings to designate the same or similar components.

As seen in FIG. 1a, a black matrix according to the embodiments of the present invention is structured to have a substrate 1, a photosensitive film 2 and a multilayered plated layer 30. The photosensitive film 2 is preferably an amorphous $TiO_2$ layer. The multilayer deposit includes an electroless Ni-plated layer 31 and Cu-plated layers 32 and 33 which are an electroless Cu-plated layer and a Cu-electroplated layer, respectively.

FIG. 1 illustrates the principle by which the multilayer thin film of the embodiments of the present invention, comprising the photosensitive film 2 and the multilayered plated layer 30, serves as a black matrix.

Figure 1B:
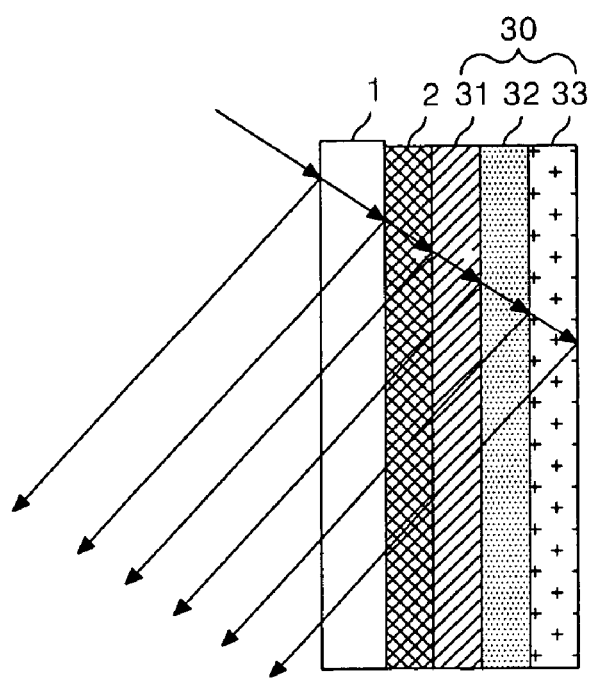
FIG. 1b is a schematic view showing that the final front reflectance of the black matrix is determined by the dissipation and destructive interference of the light beams reflected on the borders of the layers which are different in reflectance from one to another.

As seen in FIG. 1a, the high dissipation coefficient k of the multilayered plated layer 30 does not allow the light incident from the front or rear side of the substrate to pass therethrough. FIG. 1b shows the low front reflectance, which is required for the multilayer thin film of the embodiments of the present invention to serve as a black matrix. When it is incident on the front surface of the thin film, as seen in FIG. 1b, light is reflected from the respective surfaces of the substrate 1, the photosensitive film 2, the electroless Ni-plated layer 31, the electroless Cu-plated layer 32 and the Cu-electroplated layer 33, which differ in optical number from one to another. The final front reflectance is determined by the dissipation and destructive interference of the light beams reflected on the front surface of each layer. The degree to which the light beams reflected on the front surface of each layer dissipate or destructively interfere with one another depends on the optical phase difference associated with the refractive index and physical thickness of each layer. Accordingly, low front reflectance can be obtained by controlling the refractive index and physical thickness of each layer.

The preparation of the black matrix of the embodiments of the present invention starts with the application of a photo reactive compound on the substrate 1 to form a photosensitive film 2. Subsequently, the photosensitive film 2 is coated with a water-soluble polymer compound to form a water-soluble polymer layer (not shown), which is then selectively exposed to UV to obtain a latent pattern of nuclei for crystal growth. Treatment with a metal salt solution develops the latent pattern of nuclei for crystal growth into a pattern on which metal particles are deposited. On the metal particle deposit pattern, an electroless Ni-plated layer 31, an electroless Cu-plated layer 32 and a Cu electroplated layer 33 are formed in order, so as to prepare a black matrix in accordance with the embodiments of the present invention.

Figure 2:
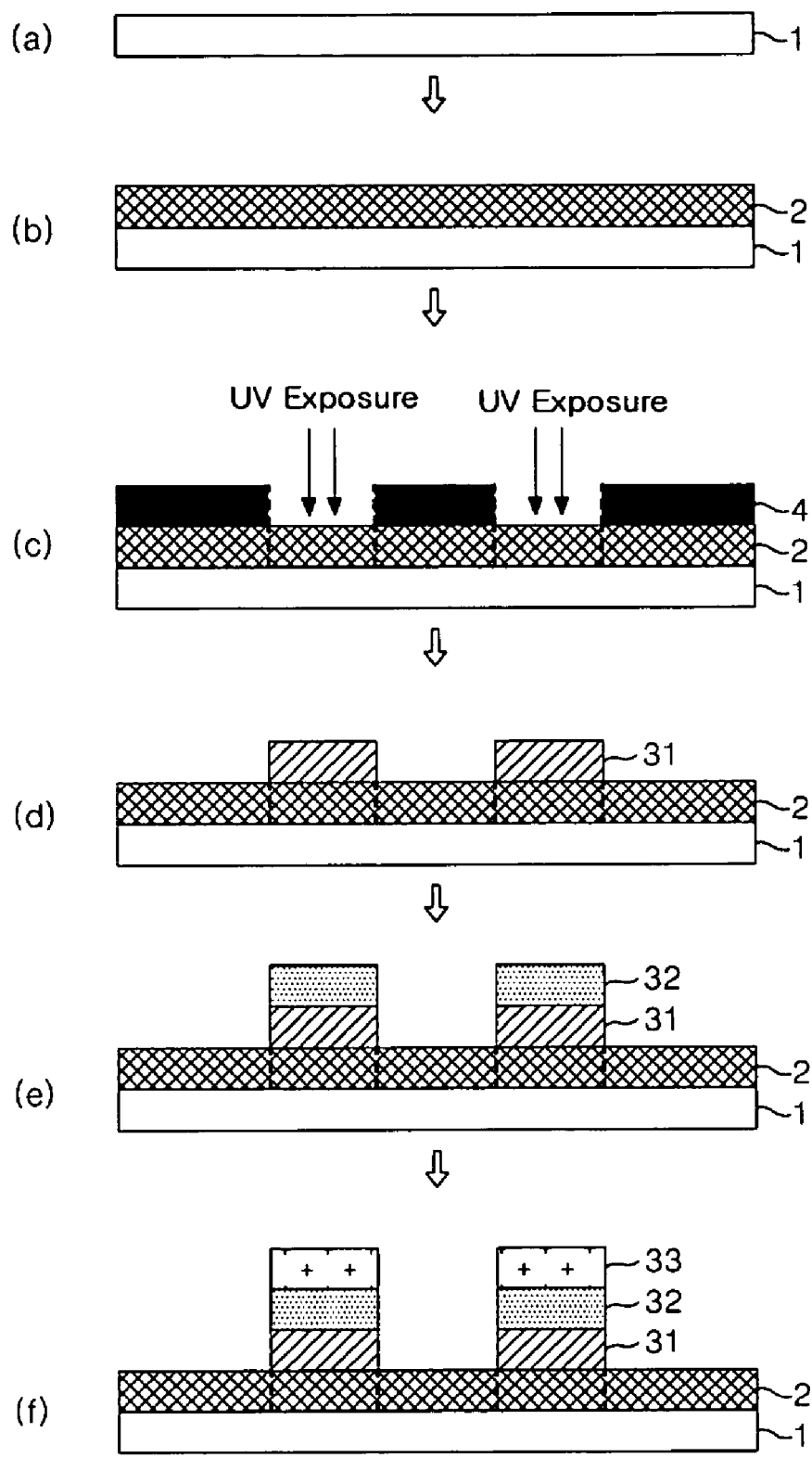
FIG. 2 is a schematic view showing the stepwise preparation of a black matrix in accordance with an embodiment of the present invention.

With reference to FIG. 2, the stepwise preparation of a black matrix according to embodiments of the present invention will be described in detail.

First, in process (i), a photoactive compound is exposed to light to form a latent pattern of nuclei for crystal growth, followed by treating the latent pattern of nuclei for crystal growth with a metal salt solution to develop a metal particle-deposited pattern.

In detail, the process (i) comprises (a) applying a photoactive compound onto a substrate to form a photosensitive film; (b) applying a water-soluble polymer onto the photosensitive film to form a water-soluble polymer layer, (c) selectively exposing the water-soluble polymer layer to light to obtain a latent pattern of nuclei for crystal growth; and (d) treating the latent pattern of nuclei for crystal growth with a metal salt solution to develop a metal particle-deposited pattern.

In step (a), a substrate 1 is coated with a photoactive compound to give a transparent amorphous photosensitive film 2 (see FIG. 2b).

Substrates suitable for the embodiments of the present invention include a transparent plastic substrate or a glass substrate, but are not limited thereto. Examples of a transparent plastic substrate include acrylic resin, polyester, polycarbonate, polyethylene, polyethersulfone, olefin maleimide copolymers, norbornene resins, with preference for olefin maleimide copolymers or norbornene resins when thermal resistance is required, and for polyester films or acryl resins when thermal resistance is not required.

The term "photoactive compound" as used herein means a compound whose properties vary with light. Particularly, the photoactive compound preferably remains inactive before exposure to light and is activated to have high reactivity when exposed to UV. Electron excitation happens in light-exposed regions of a photosensitive film to cause the photoactive compound to be reductive. Thus, metal ions are reduced at the exposed regions to give a negative pattern.

Useful as the photoactive compound in the embodiments of the present invention is a Ti-containing organic metal compound, which preferably can form transparent amorphous $TiO_2$. Concrete examples of the photoactive compound include tetraisopropyltitanate, tetra-n-butyl titanate, tetrakis(2-ethyl-hexyl)titanate, and polybutyltitanate.

For the application of the photoactive compound on the substrate 1, various coating methods, such as spin coating, spray coating, and screen coating, may be carried out using a solution of the photoactive compound in a suitable solvent, such as isopropyl alcohol. After being coated on the substrate 1, the photoactive compound is heated at 200° C. or less for 20 min or less in a hot plate or a convection oven to form a photosensitive film. A heating temperature higher than 200° C. may cause the formation of a crystalline $TiO_2$ layer, deteriorating optical properties.

In step (b), a water-soluble polymeric compound is applied onto the photosensitive film 2 applied in step (a) to form a water-soluble polymer layer (not shown).

Examples of suitable water-soluble polymers include homopolymers, such as polyvinyl alcohol, polyvinylphenol, polyvinyl pyrrolidone, polyacrylic acid, polyacryl amide, gelatin, etc., or their copolymers.

After the water-soluble polymer is dissolved in water at a concentration from 2 to 30 weight %, the solution is applied onto the photosensitive film. Upon UV exposure, the water-soluble polymer coating thus formed promotes photoreduction, serving to improve photocatalytic activity.

Preferably, a photo-accelerator may be added to the solution of step (b) so as to improve the photosensitivity of the water-soluble polymer coating. As a photo-accelerator, a water-soluble dye, organic acid, organic acid salt, or organic amine may be used. Specific examples of a photo-accelerator suitable for the embodiments of the present invention include tar dyes, potassium or sodium salts of chlorophylline, riboflavine or its derivatives, water-soluble annatto, $CuSO_4$, caramel, curcumine, cochinal, citric acid, ammonium citrate, sodium citrate, oxalic acid, potassium tartrate, sodium tartrate, ascorbic acid, formic acid, triethanolamine, monoethanolamine, and malic acid.

The photo-accelerator is used in an amount from 0.01 to 5 weight parts per 100 weight parts of the water-soluble polymer.

Using the coating method of step (a), the water-soluble polymer solution may be applied onto the photosensitive film, followed by drying at 100° C. or less for 5 min or less to form a water-soluble polymer layer. The thickness of the water-soluble polymer layer is optimized depending on light exposure conditions and typically, is not more than several µm.

The water-soluble polymer layer is washed off when a latent pattern of nuclei for crystal growth obtained by UV exposure in subsequent step (c) is treated with a metal salt solution in step (d). In order to prevent the metal salt solution of step (d) from being polluted with the water-soluble polymer, the latent pattern of nuclei for crystal growth obtained in step (c) may be washed with water to remove the water-soluble polymer layer. Consequently, no water-soluble polymer layers are present on the black matrix finally obtained in the embodiments of the present invention.

In step (c), the water-soluble polymer layer is selectively exposed to light to obtain a latent pattern of nuclei for crystal growth (see FIG. 2(*c*)). Using a photomask 4, the water-soluble polymer layer formed in step (b) is selectively exposed to UV to obtain a latent pattern of nuclei for crystal growth, which consists of an activated portion and an inactivated portion (exposed regions are represented by the two areas between the two sets of dotted lines in FIG. 2(*c*) to (*f*)).

No limitations are imposed on the conditions of exposure, such as atmosphere and light intensity, which are dependent on the photoactive compound employed. The pattern of the activated photoactive compound, obtained in this step, serves as a nucleus for the crystal growth of metal particles in a subsequent plating process.

In step (d), the latent pattern of nuclei for crystal growth obtained in step (c) is treated with a metal salt solution to develop a pattern on which metal particles are deposited (not shown). Suitable for the treatment are an Ag salt solution, a Pd salt solution or a mixture thereof. Because the metal particle-deposited pattern developed from the latent pattern of nuclei for crystal growth has sufficient activity to act as a catalyst for promoting crystal growth, an electroless Ni-plated layer 31 can be grown more finely with good adhesion in a subsequent step.

In process (ii) following process (i) comprising steps (a) to (d), an electroless Ni-plated layer 31 is formed on the metal particle-deposited pattern (see FIG. 2(*d*)). When the metal particle-deposited pattern is electroless plated with Ni, Ni crystals grow on the patterned nuclei to develop a metal pattern. This Ni metal pattern preferably has a thickness of 0.3 µm or less. For example, a thick Ni metal pattern causes a large step and has a bad effect on quality.

The electroless Ni-plating treatment may be achieved by dipping the patterned substrate in a plating solution comprising (i) a nickel salt, (ii) a reducing agent, (iii) a complexing agent, (iv) a pH adjustor, (v) a pH buffer, and (vi) an improving agent. Thermal treatment may be conducted to improve electric properties and adhesion.

The nickel salt used in the plating solution functions to supply nickel ions to the substrate and can be exemplified by chlorides, sulfates and acetates of nickel. Preferable is nickel chloride.

Exemplified by $NaBH_4$, $KBH_4$, $NaH_2PO_2$, hydrazine, formalin, and glucose, the reducing agent used in the plating solution of the embodiments of the present invention acts to reduce the metal ions on the substrate. Preferable is $NaH_2PO_2$.

The complexing agent used in the plating solution of the embodiments of the present invention functions to prevent hydroxide precipitation in alkaline solutions and to buffer the concentration of free metal ions, thereby preventing the decomposition of metal salts and controlling a plating rate. Examples of the complexing agent suitable for the embodiments of the present invention include ammonia solutions, acetic acid, guanine acid, chelating agents such as EDTA, and organic amine compounds, with preference for chelating agents such as EDTA.

As the pH adjustor used in the plating solution of the embodiments of the present invention, which acts to adjust the pH of the plating solution, an acid or base compound is employed.

As the pH buffer used in the plating solution of the embodiments of the present invention, which restricts pH modulation in the plating solution, various organic acids or inorganic compounds having weak acidity may be employed.

The improving agent used in the plating solution of the embodiments of the present invention is a compound which can improve coating properties and planarization properties. Useful as the improving agent are typical surfactants and adsorbents that can adsorb crystal growth-interfering components.

In process (iii), an electroless Cu-plated layer 32 is formed on the electroless Ni-plated layer 31 (see FIG. 2(e)). After being formed, the electroless Ni-plated layer 31 is electroless plated with Cu to form an electroless Cu-plated layer 32.

The electroless Cu plating may be achieved by dipping the substrate on which the electroless Ni-plated layer 31 is formed in a plating solution comprising copper ions, a reducing agent, a complexing agent, and an improving agent.

In order to promote the crystal growth in process (iii) to give a finer electroless Cu-plated layer having excellent adhesion, the electroless Ni-plated layer obtained in process (ii) may be additionally treated with the metal salt solution used in step (d) of process (i). That is, an Ag salt solution, a Pd salt solution or a mixture thereof may be used to treat the electroless Ni-plated layer to obtain a pattern on which metal particles are deposited.

In addition, a conductive Cu-plated layer 33 may be formed after the formation of the electroless Cu-plated layer 32 so as to increase the electric conductivity of the black matrix (see FIG. 2(f)).

The Cu electroplating may be achieved by dipping the substrate having the electroless Cu-plated layer 32 in a plating solution comprising copper sulfate, sulfuric acid, chlorine, and other additives and applying an electric field across the solution. A thermal treatment may be conducted to improve the electrical properties and adhesion of the Cu electroplated layer 33.

In accordance with the embodiments of the present invention, a black matrix can be prepared by controlling the front reflection through the modulation of the thickness and reflectance of each layer, without the employment of complicated processes such as vacuum sputtering or photolithography. Appropriate line widths and pitch sizes in the pattern can be attained by controlling the line widths and pitches of the photomask in the UV exposure step.

Therefore, the black matrix of the embodiments of the present invention has good visibility due to low front reflection and can be blackened only by selective multilayer plating, so that it can be applied to various flat display devices. In addition, having excellent electric conductivity, the black matrix can be used in an electromagnetic interference filter, without additionally blackening the front surface.

A better understanding of the embodiments of the present invention may be obtained through the following examples which are set forth to illustrate, but are not to be construed as the limit of the embodiments of the present invention.

EXAMPLE 1

A solution of polybutyl titanate in isopropanol (5.0 wt %) was spin-coated at 2,000 rpm on a glass substrate and the coating was dried at 100° C. for 5 min on a hot plate to form a photosensitive film 40 nm thick. A solution of 10 g of polyvinyl alcohol (MW 6,000), 12 g of citric acid, 1.0 ml of triethanol amine and 15 ml of isopropyl alcohol in 200 ml of distilled water was spin-coated at 2,000 rpm on the photosensitive film to form a water-soluble polymer layer 400 nm thick. After being masked by a photomask having a fine mesh pattern, the water-soluble polymer layer was exposed to UV light. After the exposure, the substrate was dipped for 1 min in a solution of 0.3 g of $PdCl_2$, 10 g of KCl and 10 ml of conc. hydrochloric acid in 1 liter of distilled water to deposit Pd particles on the exposed regions, thereby forming a negative pattern of Pd nuclei for crystal growth. Prepared from an aqueous solution containing the water-soluble polymer and a photo-accelerator, the water-soluble polymer layer was washed off when it was dipped in the aqueous Pd salt solution after the UV exposure.

Using a Ni electroless plating solution of Table 1 which was maintained at 50° C., electroless plating was conducted for 1 min on the negative pattern of nuclei for crystal growth to obtain an electroless Ni-plated layer 70 nm thick. Thereafter, the electroless Ni-plated layer was thermally treated at 230° C. for 2 hours in a drying oven.

Using a Cu electroless plating solution of Table 2 maintained at 40° C., electroless plating was conducted for 30 sec on the electroless Ni-plated layer to form a Cu film which was then grown to a thickness of 50 nm. Subsequently, while being maintained at 40° C., a Cu electroplating solution shown in Table 3 was plated for 20 min on the electroless Cu-plated layer in the presence of a current density of 0.1 $A/dm^2$ to form a Cu film which was then grown 1.3 μm thick.

After the formation of each layer, physical properties were measured according to the methods described below, and the results are given in Table 4.

(1) Measurement of Film Thickness

Using a surface profiler (Alpha-Step), manufactured by Dektak, the thickness of each film was determined.

(2) Measurement of Surface Resistance

Surface resistance was measured using a 4-point probe.

(3) Measurement of Front Reflectance

After a reflection spectrum at 350 to 950 nm was obtained using LAMDA900, reflectance at 550 nm was measured to determine front surface reflectance.

TABLE 1

| Composition of Electroless Ni-Plating Solution |
| --- |
| Distilled water = 1 liter |
| $NiCl_2.6H_2O$ = 10 g |
| $NaH_2PO_2.2H_2O$ = 30 g |
| $CH_3COONa$ = 6 g |
| $NH_4Cl$ = 40 g |

TABLE 2

| Composition of Electroless Cu-Plating Solution |
| --- |
| Copper sulfate = 3.5 g |
| Rochelle salt = 8.5 g |
| Formalin (37%) = 30 g |
| Thiourea = 1 g |
| Ammonia = 40 g |
| Distilled water = 1 liter |

TABLE 3

Composition of Cu-Electroplating Solution $CuSO_4 \cdot 5H_2O = 90$ g
$K_4P_2O_7 = 320$ g
Citric Acid = 21 g

TABLE 4

| Processes | Film Thick. (nm) | Surface Resist. (Ω/□) | Front Surface Reflectance (based at 550 nm, %) |
|---|---|---|---|
| After photoactive film | 40 | — | 20 |
| After electroless Ni-plated layer | 70 | 190 | 32 |
| Ni thermal treatment | 70 | 36 | 30 |
| After electroless Cu-plated layer | 50 | 7 | 8 |
| After Cu electroplated layer | 1,300 | 0.045 | 7 |

As is apparent from the data of Table 4, the black matrix prepared according to an embodiment of the present invention has a surface resistance of 0.045 Ω/□, thereby exhibiting an excellent electromagnetic interference effect. In addition, the black matrix was found to have a front reflectance of 7% or less on the basis of 550 nm.

Figure 3:
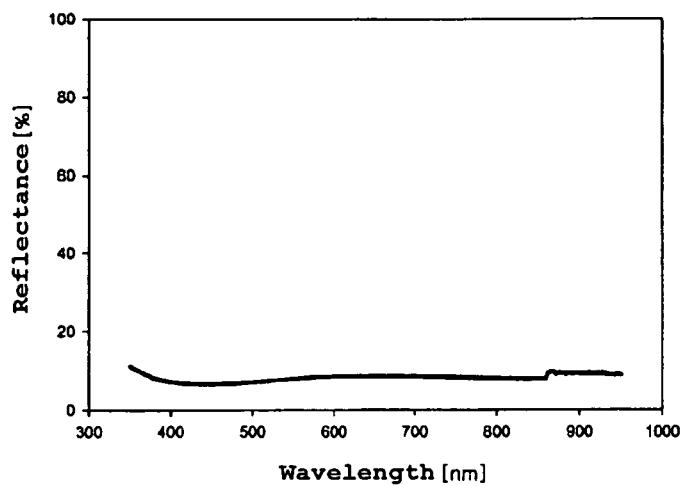
FIG. 3 is a graph showing a front reflectance spectrum at 350 to 950 nm obtained by scanning a black matrix prepared in accordance with an embodiment of the present invention.
Figure 4:
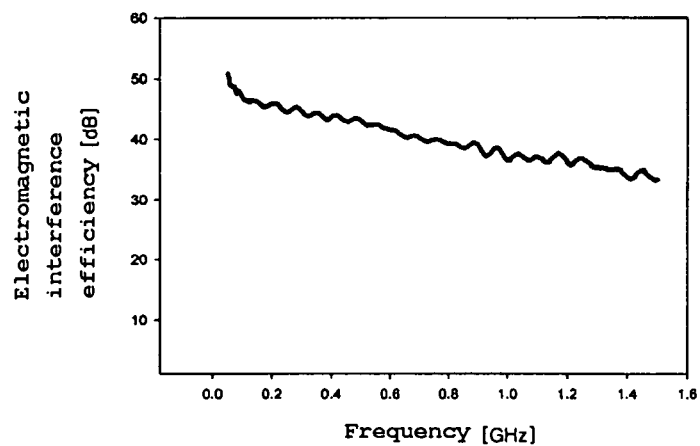
FIG. 4 is a graph showing the electromagnetic interference efficiency of the black matrix prepared in an embodiment of the present invention.
Figure 5:
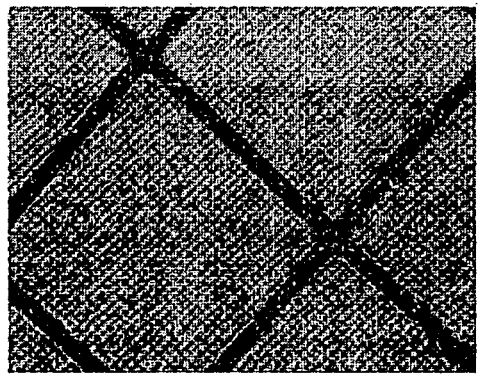
FIG. 5 is an optical micrograph of a black matrix prepared in accordance with an embodiment of the present invention.

FIG. 3 is a graph showing a front reflectance spectrum at 350 to 950 nm obtained by scanning the black matrix prepared in the example, using LAMDA 900. As seen in FIG. 3, the black matrix of an embodiment of the present invention shows reflectance of less than 10% over the measured range. FIG. 4 shows the electromagnetic interference efficiency of the black matrix prepared in the example at 0.05 to 1.5 GHz. As seen in FIG. 4, the black matrix prepared according to an embodiment of the present invention has excellent electromagnetic inference efficiency. FIG. 5 is an optical micrograph of the black matrix prepared in the example.

Exhibiting excellent black tone, which is achieved by a selective multilayer plating process, without using expensive vacuum sputtering apparatus or a photolithographic process, as described hereinbefore, the black matrix of the embodiments of the present invention can be applied to various flat display devices. In addition, due to excellent electric conductivity, the black matrix of the embodiments of the present invention can be used in an electromagnetic interference filter, without employing an additional front surface blackening process.

Although the preferred embodiments of the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A black matrix, comprising:
   (i) a substrate;
   (ii) a photosensitive film in direct contact with the substrate;
   (iii) a Ni-plated layer positioned on the photosensitive film; and
   (iv) a Cu-plated layer positioned on the Ni-plated layer.

2. The black matrix as defined in claim 1, wherein the photosensitive film is a $TiO_2$ layer.

3. The black matrix as defined in claim 1, wherein the Ni-plated layer is an electroless Ni-plated layer.

4. The black matrix as set forth in claim 1, wherein the Cu-plated layer comprises an electroless Cu-plated layer and a Cu-electroplated layer.

5. An electromagnetic interference filter, comprising the black matrix of claim 1.

6. A flat display device, comprising the black matrix of claim 1.

7. A black matrix as defined in claim 1, wherein the photosensitive film includes an Ti-containing organic metal compound.

8. A black matrix as defined in claim 1, further comprising:
   a metal particle-deposited pattern interposed between the photosensitive film and the Ni-plated layer and operative to promote crystal growth of the Ni-plated layer.

9. A method for preparing a black matrix, comprising:
   (i) exposing a photoactive compound to form a latent pattern of nuclei for crystal growth and treating the latent pattern of nuclei for crystal growth with a metal salt solution to give a metal particle-deposited pattern;
   (ii) forming an electroless Ni-plated layer on the metal particle-deposited pattern; and
   (iii) forming an electroless Cu-plated layer on the electroless Ni-plated layer.

10. The method as defined in claim 9, wherein the step (i) comprises (a) applying the photoactive compound onto a substrate to form a photosensitive film; (b) applying a water-soluble polymer onto the photosensitive film to form a water-soluble polymer layer; (c) selectively exposing the water-soluble polymer layer to light to give a latent pattern of nuclei for crystal growth; and (d) treating the latent pattern of nuclei for crystal growth with a metal salt solution to afford a metal salt particle-deposited pattern.

11. The method as defined in claim 10, further comprising forming a Cu-electroplated layer on the electroless Cu-plated layer formed in the step (iii).

12. The method as defined in claim 10, further comprising treating the electroless Ni-plated layer with a metal salt solution to give a metal particle-deposited pattern before the formation of the electroless Cu-plated layer in step (iii).

13. The method as defined in claim 10, wherein the photoactive compound of step (i) is an organic metal compound containing Ti.

14. The method as defined in claim 10, further comprising adding a photo-accelerator to the water-soluble polymer before the formation of the water-soluble polymer layer in step (b).

15. The method as defined in claim 14, wherein the photo-accelerator is used in an amount from 0.01 to 5 weight parts per 100 weights parts of the water-soluble polymer.

16. The method as defined in claim 14, wherein the water-soluble polymer is selected from a group consisting of homopolymers and copolymers of polyvinyl alcohol, polyvinyl phenol, polyvinyl pyrrolidone, polyacrylic acid, polyacrylic amide and gelatine.

17. The method as defined in claim 14, wherein the photo-accelerator is selected from a group consisting of water-soluble dye, water-soluble organic acids, water-soluble organic acid salts, and water-soluble organic amines.

18. The method as defined in claim 17, wherein the photo-accelerator is selected from a group consisting of tar dye, potassium or sodium salts of chlorophylline, riboflavine or its derivatives, annatto, $CuSO_4$, caramel, curcumine, cochinal, citric acid, ammonium citrate, sodium citrate, oxalic acid, potassium tartrate, sodium tartrate, ascorbic acid, formic acid, triethanolamine, monoethanolamine, and malic acid.

19. The method as defined in claim 10, wherein the metal salt solution is selected from a group consisting of an Ag salt solution, a Pd salt solution and mixtures thereof.

20. The method as defined in claim 9, further comprising forming a Cu-electroplated layer on the electroless Cu-plated layer formed in the step (iii).

21. The method as defined in claim 9, further comprising treating the electroless Ni-plated layer with a metal salt solution to give a metal particle-deposited pattern before the formation of the electroless Cu-plated layer in step (iii).

22. The method as defined in claim 9, wherein the photoactive compound of step (i) is an organic metal compound containing Ti.

23. The method as defined in claim 22, wherein the organic metal compound containing Ti is selected from a group consisting of tetraisopropyltitanate, tetra-n-butyl titanate, tetrakis(2-ethyl-hexyl)titanate and polybutyltitanate.

24. The method as defined in claim 9, wherein the metal salt solution is selected from a group consisting of an Ag salt solution, a Pd salt solution and mixtures thereof.

* * * * *